A. L. & W. A. Hatch.
Hop Pole Puller.
Nº 85,587. Patented Jan. 5, 1869.
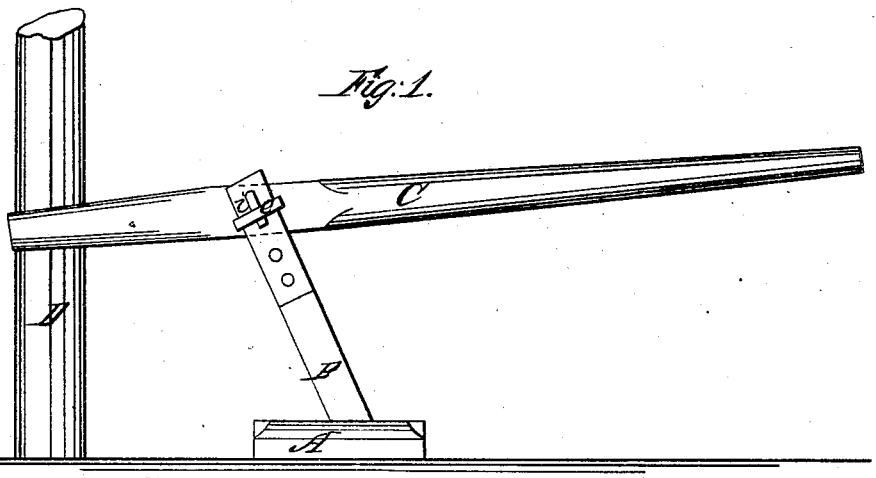
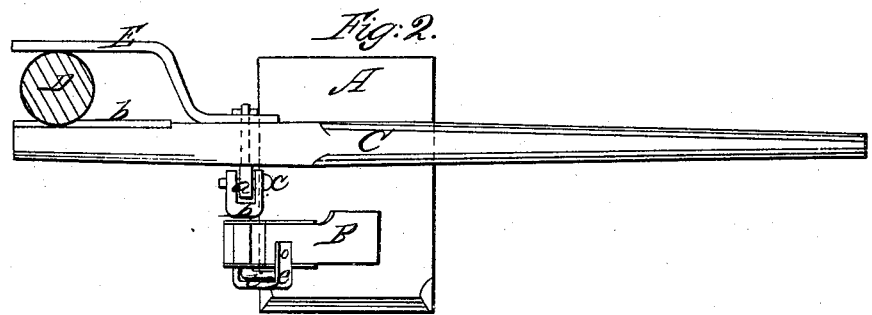
Witnesses:
Wm A Morgan
G. G. Cotton
Inventor:
A. L. Hatch
W. A. Hatch
per Munn &
Attorneys

United States Patent Office.

A. L. HATCH AND W. A. HATCH, OF LOYD, WISCONSIN.

*Letters Patent No. 85,587, dated January 5, 1869.*

IMPROVEMENT IN HOP-POLE PULLER.

The Schedule referred to in these Letters Patent and making part of the same.

*To all whom it may concern:*

Be it known that we, A. L. HATCH and W. A. HATCH, of Loyd, in the county of Richland, and State of Wisconsin, have invented a new and useful Improvement in Implements for Pulling Hop-Poles; and we do hereby declare that the following is a full, clear, and exact description thereof, which will enable others skilled in the art to make and use the same, reference being had to the accompanying drawings, forming part of this specification, in which—

Figure 1 is a side view of our invention.

Figure 2 is a top view of the same.

Similar letters of reference indicate like parts.

The object of this invention is to extract hop-poles from the ground in an expeditious and easy manner.

It consists of a lever or hand-spike pivoted to the upright of a pedestal-board, or block, with a joint permitting a double movement of the lever, to wit, the usual vibrating movement, and a downward swinging of the lever.

The lever is provided with a stout iron prong or tine, affixed near the end of the same, and running out parallel to the short arm of the same, leaving a space between it and the said short arm, suitable for receiving and cramping upon hop-poles, in the act of extracting them from the ground.

In the accompanying drawings—

C is the lever pivoted to the slanting upright B, affixed to the pedestal-block A.

The eye-bolt $a$ is attached to the jaws $b$ of a bolt, resting in a notch in the upright, and held in the said notch by the plate affixed to the sides of the upright, the said bolt passing through the said plates, as shown.

The shank of the eye-bolt passes through the lever, with a nut on its opposite end, thus serving to affix the prong E to the lever.

The space between the prong E and the lever is sufficiently wide to secure the largest hop-pole, and the proximate side of the short arm is armed with a metal plate, $b$, to cramp against the hop-pole, and take a firm hold of the same, when actuated to do so.

The prong E is square, and when the lever is being swung downward on the pin $c$ of the joint, the prong cramps upon the hop-pole, presenting its angle or edge to impinge against the former, thus cramping the pole between it and the plate $b$.

By pressing downward on the long arm of the lever, the pole thus firmly held, is extricated a short distance from the ground.

If one movement of the lever is not sufficient to withdraw the pole, a second or third may be made, in the manner of a pump-handle, for when the handle of a lever is lifted, the hold of the prong and plate is released, and the same slipped further down on the pole, but when the handle is borne down, the prong and plate cramp immediately upon the pole, thus holding it firmly and raising it from the ground.

This action is due to the manner of hanging or pivoting the lever, so that it shall swing or roll downward in a manner suitable for cramping or jamming upon the pole.

The vibration of the lever is limited by the stop $i$, which is a continuation of the shank of the jaws $b$. This stop vibrates within an iron guard, $e$, and, encountering it, limits the vibration to the lever.

The devices composing and pertaining to the pivot-joint of the lever perfect its operation, although we desire to be understood as not limiting our invention to the precise arrangement shown, as the double motion, suitable for cramping upon the hop-poles, and extracting them, can be obtained by many different forms of swivel-joint, a simple form of which would be two interlocking staples, or a bore-and-socket joint.

There are many varieties of such joints, which are familiar to those skilled in mechanism, and were we limited to any particular device, our patent might be easily evaded by substituting a different joint, permitting the double motion to the lever, above described.

This implement is easily conveyed from place to place, and affords an easy means of extracting hop-poles and stakes from the ground.

Having thus described our invention,

We claim as new, and desire to secure by Letters Patent—

1. The lever C having a prong, E and connected to the side of a standard, B, by a joint, $a\ c\ b$, substantially as herein set forth and shown.

2. The stop $i$ and guard $e$, substantially as described, in the standard B of the lever C, all as set forth.

A. L. HATCH.
W. A. HATCH.

Witnesses:
W. W. STEWART,
A. RALLET.